United States Patent
Bennett et al.

(10) Patent No.: US 10,428,773 B1
(45) Date of Patent: Oct. 1, 2019

(54) SNORKEL SYSTEM (71) Applicant: OMIX-ADA, INC., Ann Arbor, MI (US)

(72) Inventors: Patrick W. Bennett, Gainsville, GA (US); Eric Lance Russell, Lilburn, GA (US)

(73) Assignee: OMIX-ADA, INC., Ann Arbor, MI (US)

( * ) Notice: Subject to any disclaimer, the term of this patent is extended or adjusted under 35 U.S.C. 154(b) by 0 days.

(21) Appl. No.: 16/171,428

(22) Filed: Oct. 26, 2018

(51) Int. Cl.
*F02M 35/10* (2006.01)
*B60K 13/02* (2006.01)

(52) U.S. Cl.
CPC ....... *F02M 35/10013* (2013.01); *B60K 13/02* (2013.01)

(58) Field of Classification Search
CPC ....... F02M 35/10013; F02M 35/10006; F02M 35/10; B60K 13/00; B60K 13/02
USPC ......................................... 180/68.3
See application file for complete search history.

(56) References Cited

U.S. PATENT DOCUMENTS

| 3,987,862 | A | * | 10/1976 | Lidstone | ................ | B60K 13/02 |
| | | | | | | 180/68.1 |
| 4,366,878 | A | * | 1/1983 | Warf | ..................... | B60K 13/02 |
| | | | | | | 180/68.3 |
| 5,671,802 | A | | 9/1997 | Rogers | | |
| 6,152,096 | A | | 11/2000 | Setsuda | | |
| 6,287,354 | B1 | | 9/2001 | Nozaki | | |
| 6,314,931 | B1 | | 11/2001 | Yasuda et al. | | |
| 6,530,443 | B1 | | 3/2003 | Tsuruta et al. | | |
| D636,408 | S | | 4/2011 | Luxon et al. | | |
| D636,787 | S | | 4/2011 | Luxon et al. | | |
| D636,788 | S | | 4/2011 | Luxon et al. | | |
| D637,205 | S | | 5/2011 | Luxon et al. | | |
| D637,206 | S | | 5/2011 | Luxon et al. | | |
| D637,623 | S | | 5/2011 | Luxon et al. | | |
| D638,446 | S | | 5/2011 | Luxon et al. | | |
| D642,199 | S | | 7/2011 | Luxon et al. | | |
| D648,745 | S | | 11/2011 | Luxon et al. | | |
| D687,071 | S | | 7/2013 | Bennett | | |

(Continued)

OTHER PUBLICATIONS

Black Coated RAM Air Snorkel Intake System Kit for 07-11 JK Jeep Wrangler 3.8 V6, ebay.com, last accessed Oct. 22, 2018.

(Continued)

*Primary Examiner* — John D Walters
(74) *Attorney, Agent, or Firm* — The Dobrusin Law Firm, P.C.; Daniel P. Aleksynas (57) ABSTRACT

A snorkel system comprising: (a) a vehicle adapter configured to connect to a vehicle; (b) one or more air tubes configured to extend along an interior of an engine compartment of the vehicle; and (c) one or more angle adapters adapted to be located within the engine compartment of the vehicle, the one or more angle adapters fluidly connecting the vehicle adapter and the one or more air tubes together; wherein the one or more angle adapters include: an inlet opening located within a first plane, the inlet opening being located proximate to and in fluid communication with the vehicle adapter, and an outlet opening being in communication with a first end of the one or more air tubes, the outlet opening being located within a second plane that is spaced apart from and extends substantially parallel to the first angle adapter.

20 Claims, 8 Drawing Sheets

(56) References Cited

U.S. PATENT DOCUMENTS

| | | | |
|---|---|---|---|
| D687,072 S | 7/2013 | Bennett | |
| 8,960,347 B2* | 2/2015 | Bennett | B60K 13/02 180/68.3 |
| 9,234,484 B2* | 1/2016 | Lewington | F02M 35/10013 |
| 9,909,542 B2* | 3/2018 | Rother | F02M 35/1255 |
| 2002/0023792 A1 | 2/2002 | Bouffard et al. | |
| 2005/0217625 A1 | 10/2005 | Niaken et al. | |
| 2006/0065231 A1 | 3/2006 | Nozaki et al. | |
| 2006/0185639 A1* | 8/2006 | Rosenbaum | F02M 35/10137 123/184.21 |
| 2006/0219209 A1 | 10/2006 | Tsuruta et al. | |
| 2006/0230728 A1 | 10/2006 | Tsuruta et al. | |
| 2007/0012274 A1 | 1/2007 | Kawatani | |
| 2009/0260906 A1 | 10/2009 | Hartland et al. | |
| 2010/0078239 A1 | 4/2010 | Beloy | |
| 2010/0083928 A1 | 4/2010 | Saito et al. | |
| 2017/0260939 A1* | 9/2017 | Williams | F02M 35/10013 |

OTHER PUBLICATIONS

AEV Jeep Wrangler JK Snorkel Pre Filter, Sam's 4X4, sams4X4. com, last accessed Oct. 22, 2018.
Potentially Related U.S. Appl. No. 13/544,251, filed Jul. 9, 2012, granted as U.S. Pat. No. 8,960,347 on Feb. 24, 2015.
Potentially Related U.S. Appl. No. 29/434,144, filed Oct. 10, 2012, granted as U.S. Pat. No. D687,071 on Jul. 30, 2013.
Potentially Related U.S. Appl. No. 29/434,147, filed Oct. 10, 2012, granted as U.S. Pat. No. D687,072 on Jul. 30, 2013.
Potentially Related U.S. Appl. 29/667,519, filed Oct. 23, 2018.
Potentially Related U.S. Appl. No. 29/667,886, filed Oct. 25, 2018.
Potentially Related U.S. Appl. No. 29/667,549, filed Oct. 23, 2018.

\* cited by examiner

Fig. 10

SNORKEL SYSTEM

FIELD

The present teachings relate to a snorkel system that raises the level of air flow into an air box and more specifically a snorkel system with contoured air tubes that fit within a fender region as well as a new attachment mechanism to attach the snorkel system an original air box.

BACKGROUND

Off-road vehicles can encounter water, mud, or other fluids during an off-road adventure that may be significantly deep so that fluid may come over the air intake and within a vehicle's engine. Attempts have been made to increase the height of the intake so that fluid can extend over a traditional intake and air can continue to be supplied to the motor so that the motor continues to run. When the height of the intake is increased, air still needs to be supplied into the air intake so that combustion continues within the engine and the vehicle continues to move. In order to ensure that air is supplied to the engine the snorkel system needs to be coupled to an air intake. However, an amount of space available within an engine compartment may be limited. Attempts have been made to create snorkels which may be found in U.S. Pat. Nos. D636,408; D648,745; D687,071; D687,072; 6,530,443; and 8,960,347 and U.S. Patent Application Publication No. 2002/0023792; 2010/0078239; and 2010/0083928.

It would be attractive to have one or more adapters, one or more air tubes, or both that extend within the engine compartment to connect the snorkel system to the air intake. What is needed is one or more angle adapters that extend around one or more engine components so that the air tubes connect the snorkel system to air tubes. What is needed is one or more angle adapters that supply fluid from an inlet to the air tubes without interfering with maintenance with of the engine components. It would be attractive to have a transfer connector with a transfer outlet that connects the snorkel system to an air intake.

SUMMARY

The disclosure meets one or more of the needs by providing: a snorkel system comprising: (a) a vehicle adapter configured to connect to a vehicle; (b) one or more air tubes configured to extend along an interior of an engine compartment of the vehicle; and (c) one or more angle adapters adapted to be located within the engine compartment of the vehicle, the one or more angle adapters fluidly connecting the vehicle adapter and the one or more air tubes together; wherein the one or more angle adapters include: an inlet opening located within a first plane, the inlet opening being located proximate to and in fluid communication with the vehicle adapter, and an outlet opening being in communication with a first end of the one or more air tubes, the outlet opening being located within a second plane that is spaced apart from and extends substantially parallel to the first angle adapter.

The present teachings provide one or more adapters, one or more air tubes, or both that extend within the engine compartment to connect the snorkel system to the air intake. The present teachings provide one or more angle adapters that extend around one or more engine components so that the air tubes connect the snorkel system to air tubes. The present teachings provide one or more angle adapters that supply fluid from an inlet to the air tubes without interfering with maintenance with of the engine components. The present teachings provide a transfer connector with a transfer outlet that connects the snorkel system to an air intake.

DETAILED DESCRIPTION

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a snorkel system that functions to elevate an air inlet. The snorkel system may raise the air inlet to a top of a hook, a top of a roof, or both. The snorkel system may be substantially entirely located within an engine compartment of a vehicle. The snorkel system may include an connection plate that couples an external portion of the snorkel system to an internal portion of the snorkel system. The snorkel system may have an external ram that receives air and transports the air to an air intake in the engine. The snorkel system may be a low mount snorkel system (e.g., an inlet is mounted at a hood level). The snorkel system may be a high mount snorkel system (e.g., an inlet is mounted at a roof level).

A high mount snorkel system may function to elevate a ram, an air intake, or both above a hood, a windshield, or both of a vehicle. The high mount may include one or more snorkel extenders. The high mount may elevate an air intake about 1 m or more, 1.5 m or more, or about 1.75 m or more above the ground. The high mount, low mount, or both may be connected to the vehicle by one or more vehicle adapters.

The one or more vehicle adapters may function to connect all or a portion of a snorkel system to a vehicle. The vehicle adapter may replace a panel, a quarter panel, or both The vehicle adapter may function to provide an inlet into the engine compartment. The vehicle adapter may create an inlet where air can pass from external of a vehicle to an internal location, the engine compartment, an air intake, air box, or a combination thereof. The one or more vehicle adapters may seamlessly connect a snorkel system to a vehicle. The one or more vehicle adapters may create a space into the engine compartment without having to cut an original panel of the vehicle. The one or more vehicle adapters may replace an original panel of a vehicle. The one or more vehicle adapters may connect to one or more angle adapters internal of the vehicle. The one or more vehicle adapters may connect to one or more snorkel extenders, snorkel outlets, or both that are located on an external surface of the vehicle. The one or more vehicle adapters may include one or more inlets, connection plates, grills, connection regions, connection apertures, grill plates, or a combination thereof.

The one or more connection plates function to replace all or a portion of a quarter panel, body panel, or both. The one or more connection plates may provide ingress into an engine compartment. The one or more connection plates may form an inlet that allows fluid to flow into the snorkel system. The one or more connection plates include one or more connection regions that connect to a grill plate, a snorkel extender, a snorkel outlet, or a combination thereof. The one or more connection plates may replace an original panel of a vehicle. The one or more connection plates may replace an original panel on or around a hood of a vehicle. The one or more connection plates may include one or more connection apertures so that the one or more connection plates may directly replace an original vehicle component.

The one or more connection apertures function to connect the connection plate to a vehicle, vehicle frame, sub-frame, or a combination thereof. The one or more connection apertures may receive one or more fasteners. The connection apertures may receive a permanent or removable fastener. The connection apertures may be a through hole where a screw, bolt, threaded member, or a combination thereof extend through to connect the connection plate to a vehicle. The one or more connection apertures may be a plurality of connection apertures (e.g., 2, 3, 4, 5, 6, or more). The connection apertures may be located adjacent to, around, within, proximate to, or a combination thereof one or more connection regions.

The one or more connection regions may function to connect to a grill, grill plate, angle adapter, snorkel extender, snorkel outlet, a ram, or a combination thereof. The one or more connection regions may have an upper side that receives a grill, a grill plate, a snorkel extender, a snorkel outlet, or a combination thereof. Preferably, if the snorkel is a low mount the connection region connects a grill, a grill plate or both to the connection plate. The connection region may connect a grill, a grill plate, or both over an inlet. Preferably, if the snorkel is a high mount the connection region may connect a grill, a snorkel extender, a snorkel outlet, or a combination thereof to the connection plate. The connection regions may accept one or more fasteners. The connection regions may include one or more seals, one or more movable mounts, or both. The connection region may adapt from a high mount to a low mount or vice versa. The connection region may connect an angled adapter a connection plate, a grill, a grill plate, a snorkel extender, or a combination thereof. The connection region may be an intermediate region between an angle adapter and a snorkel extender, grill, grill plate, or a combination thereof. The connection region may cover all or a portion of an inlet. The inlet may pass through the connection region, above the connection region, below the connection region, or a combination thereof. The connection region may connect to a grill and the grill may cover the inlet.

The grill may function to cover an inlet, prevent large objects from entering the inlet, provide an aesthetic cover to the inlet, or a combination thereof. The grill may be flush with the connection plate, extend out from the connection plate, or both. The grill may prevent bugs, rocks, mud, water, dirt, or a combination thereof from entering the inlet while allowing air to enter the inlet. The grill may have a plurality of openings with geometric configurations. The openings may be symmetrical, asymmetrical, square, circular, diamond, pentagonal, hexagonal, heptagonal, octagonal, or a combination thereof. The grill may be connected to or covered by a one or more grill plates.

The one or more grill plates may function to connect the grill to the connection region, the inlet, the connection plate, or a combination thereof. The one or more grill plates may function to restrict a flow of air in one direction while facilitating a flow of air in a different direction. The one or more grill plates may cover an inlet that may expose the connection region for connection to a snorkel extender. The one or more grill plates may only be present in a low mount configuration. The one or more grill plates may be removed for a high mount configuration. The grill plate may connect the grill so that the grill is free of fasteners. The grill plate may block the grill when the snorkel system is changed into a high mount configuration. The grill plate may be separate from the grill. The grill plate may cover a top of the connection plate, the angle adapter, or both. The grill plate may be solid, free of air passages, or both. The grill plate may be located in two regions when a high mount is connected to the vehicle adapter. The grill plate may have a aesthetic grill that does not include apertures. The grill plate may be free of holes. The grill plate may close a horizontal inlet. The grill plate may have an opening so that a vertical inlet may be open. The grill plate may include one or more connection apertures that assist in connecting the grill plate to the connection region. The grill plate may include one or more posts that assist in connecting a snorkel extender to the vehicle adapter.

The one or more posts function to connect a snorkel extender to the vehicle adapter. The one or more posts may extend into one or more snorkel apertures with the snorkel extender, the snorkel outlet, or both. The one or more posts may be threaded. The one or more posts may receive one or more fasteners. The one or more posts may receive one or more nuts that are threaded on the posts. The one or more posts may extend through the snorkel extender. The one or more posts may be one or more, two or more, three or more, or four or more posts. The posts may extend above the angle adapter. The posts may receive a fastener that extends into the connection apertures to connect the grill plate to the connection region. The posts may connect the angle adapter to the connection region. The posts may include an aperture to receive a fastener that connects the angle adapter to the connection region in a first direction and to connect the snorkel extender to the connection region ins a second direction.

The one or more angle adapters function to receive air from the inlet and then transfer the air in a second direction towards an air box. The one or more angle adapters may be entirely located within an engine compartment of a vehicle. The angle adapter may turn air an angle so that the air moved from a first direction to a second direction. The angle may be about 25 degrees or more, about 45 degrees or more, about 60 degrees or more, or about 75 degrees or more. The angle may be about 175 degrees or less, about 150 degrees or less, about 125 degrees or less, or about 115 degrees or less (e.g., about 90 degrees±5 degrees). The air when moving in the second direction may begin moving in a first plane and then the angle adapter may move the air to a second plane. The first plane and second plane may be parallel. The first plane and the second plane may be located and offset so that the inlet and the outlet are offset. The angle adapter may be contoured so that the inlet opening is complementary in shape to the connection plate, the connection region, the inlet, or a combination thereof on a first end and the outlet opening is aligned with, complementary in shape to, or both the one or more air tubes on a second end.

The inlet opening may function to connect to the connection plate, the inlet or both and receive air. The inlet opening may transmit the air from an external location towards the air box. The inlet opening may be sufficiently large so that enough air is provided to the engine to combust fuel. The inlet opening may include one or more steps. The inlet opening may receive air in a direction normal to a rear surface of the inlet opening. The inlet opening may include a flat forward wall that is located proximate to a firewall between the engine compartment and the passenger compartment. The inlet opening may receive air and then direct the air in a second direction. The inlet opening may face a grill of the vehicle adapter. The inlet opening may extend within a plane. A mid-point of the inlet opening may be bisected by a plane. The plane of the inlet opening may be offset from a plane of the outlet opening. The inlet opening may connect to the connection region so that as air moves into the inlet opening air is captured by the snorkel system and provided to the air box, the engine, or both. The inlet opening may be connected to one or more step tubes.

The one or more steps tubes function to carry air from the inlet opening to the outlet opening and the one or more air tubes. The one or more step tubes may follow a contour of the vehicle. The one or more step tubes may shift so that all or a portion of the angle adapter, the air tube, or both are located under a portion of a quarter panel, fit under the hood, extend parallel to a side of the vehicle, or a combination thereof. The one or more step tubes may adjust from the first plane to the second plane without changing height of the step tube (e.g., the step tube may extend along a plane while shifting relative to two planes that are perpendicular to the plane of the step tube). The one or more tubes may extend at an angle relative to the inlet opening, the outlet opening or both. Preferably, the step tube extends at an angle relative to a leading edge of the inlet opening, the outlet opening, or both. The angle between the step tube and the inlet opening and the outlet opening may be the same. The angle between the inlet opening and the step tube may be about 15 degrees or more, about 25 degrees or more, or about 30 degrees or more. The angle between the inlet opening and the step tube may be about 75 degrees or less, about 60 degrees or less, or about 45 degrees or less. The angle between the outlet opening and the step tube may be about 15 degrees or more, about 20 degrees or more, about 30 degrees or more, or about 40 degrees or more. The angle between the outlet opening and the step tube may be about 75 degrees or less, about 60 degrees or less, or about 50 degrees or less. The step tube may begin at the inlet opening and terminate ad the outlet opening.

The outlet opening may function to transfer air from the angle adapter to the one or more air tubes. The outlet opening may have a flat end wall. The outlet opening may be offset from the inlet opening. The outlet opening and the inlet opening may be laterally offset. The outlet opening and inlet opening may face in different directions. The inlet opening and the outlet opening are in fluid communication so that fluid that enters into the angle adapter is directed towards the air box and then the engine. The outlet may be connected to an air tube by one or more connectors.

The one or more connectors may function to create a connection between two or more adjacent components so that air can pass from one component to another component. The connection may have two female ends that receive and couple two or more components together. Each female end of the connection may receive and fluidly connect two components together. The connections may have one or more male ends, one or more female ends, both male and female ends, or a combination thereof. The connections may be substantially air tight. The connectors may be held in place may a fastener. The connectors may be held in place by one or more hose clamps. The connectors may be held in place by a friction fit, a press fit, a protrusion, a detent, a lock, a screw, a pin, or a combination thereof. The connectors may be located at any joint. The connectors may be located between angle adapter and air tube, the air tube and the transfer connector, the transfer connector and an air box, or a combination thereof. The connectors may include an adhesive to form an adhesive connection. The connectors may form a fixed connection (e.g., once a connection is formed one or both parts have to be damaged to be removed). Preferably, the connectors form a quick couple connection so that the components may be connected and taken apart. More preferably, the connectors may be removed and added without use of any hand tools. For example, a lever may be pulled that releases the connector so that the connector, the a component (e.g., air tube, angle adapter, transfer connector), or both can be removed.

The one or more air tubes may function to provide air in a longitudinal direction of a vehicle. For example, the inlet may be located at a first end of an engine compartment and the air box may be located at a second end of the engine compartment and the one or more air tubes may transfer air from the inlet to the air box. There may be a single air tube. The air tubes may extend along an interior of a vehicle. The one or more tubes may extend under a hood, under a portion of a quarter panel, or both. The one or more air tubes may be low profile. The one or more air tubes may have a height that is 20 cm or less, preferably 15 cm or less, more preferably 10 cm or less, even more preferably about 7 cm or less, or most preferably about 5 cm or less. The height may be greater than 1 cm or 2 cm. The air tubes may be sufficiently low profile to fit under a hood of a car when the hood is closed without interfering with the closing of the hood. The one or more air tubes may be wider than their height. A width to height ratio may be about 1.2:1 or more, about 1.5:1 or more, about 1.75:1 or more, about 2:1 or more, about 3:1 or more, about 10:1 or less, or about 5:1 or less. The one or more air tubes may be entirely straight. The one or more air tubes may be free of curved regions. The one or more air tubes may have a serpentine portion, one or more curves, one or more arcuate portions, one or more portions that extend out of a plane, or a combination thereof. The one or more air tubes may be substantially planar so that air flow through the air tubes is in a straight line. The one or more air tubes may be substantially rigid. The one or more air tubes may include one or more ribs.

The one or more ribs may function to prevent bending, warping, folding, curving, expansion, compression, or a combination thereof of the one or more air tubes. The one or more ribs may structurally reinforce the air tube. The one or more ribs may extend longitudinally, laterally, or a direction there between. The one or more ribs may extend in a major direction (e.g., a length of the tube). The one or more ribs may extend parallel to the direction of air flow through the air tubes. The end of the air tubes may be free of ribs. The air tubes may be connected to one or more transfer connectors by one or more connectors.

The one or more transfer connectors may function to transfer air from a first location to the air box at a second location. The one or more transfer connectors may change a direction of air flow from a longitudinal direction to a vertical direction and then to a direction into the air box. The one or more transfer connectors may connect to a side of an air box and allow air to move into a side of the air box. The one or more transfer connectors may be sufficiently large so that enough air is retained within the transfer connector that the engine will run. The one or more transfer connectors may have fluid extend into a transfer inlet in a first direction, turn and extend in a second direction, and then turn a second time and extend in a third direction. The transfer connectors may have a height that is sufficiently large that the transfer connector connects to an air tube in a first plane and an air box in a second plane. The one or more transfer connectors may connect to a side of a vehicle. The one or more transfer connectors may connect to a vehicle via one or more transfer adapters.

The one or more transfer adapters may function to connect the transfer connector to the vehicle. The one or more transfer adapters may connect to a vehicle via one or more fasteners. The one or more transfer adapters may extend cantilever from the transfer connector. The one or more transfer adapters may prevent movement to the transfer connector relative to the vehicle. The one or more transfer adapters may allow for some pivotable movement of the transfer connector. Preferably, the transfer adapter and a wall of the vehicle prevent movement of the transfer connector once the transfer connector is connected to the vehicle so that the transfer inlet, transfer outlet, or both remain fixed in place.

The one or more transfer inlets function to receive air that flows from the one or more air tubes. The one or more transfer inlets may be located in a first plane, a same plane as an air tube, or both. The one or more transfer inlets may be connected to an air tube by one or more connectors. The one or more transfer inlets may be aligned with an air tube and air may flow from the air tube into the transfer inlet. The transfer inlet may be located in a top half, top quarter, or aligned with a top layer of the transfer connector. The transfer inlet may be complementary in shape or have an opening that is complementary in shape to the one or more air tubes. The transfer inlet and the transfer outlet may be located in different planes, different sides, different directions, or a combination thereof of each other within the transfer connector. The one or more transfer outlets may function to transfer air from the transfer connector to an air box. The one or more transfer outlets may directly provide air into an air box. The one or more transfer outlets may direct air in a direction of about 75 degrees, more 115 degrees or less, or about 90 degrees from the direction of air in the inlet. The air may flow into the transfer inlet in a first direction and exit the transfer outlet in a second direction or a third direction. The transfer inlet and the transfer outlet may be connected by a transfer body. The one or more transfer outlets may extend into the air box, include an adapter that extends into the air box or both.

The adapter may function to form a fluid connection with an air box, fluidly connect the snorkel system to the air box, or both. The adapter may function to connect to an existing air box without adding additional pieces to the air box, without modification to the air box, or both. The adapter may plug into the air box so that air is supplied from the snorkel system into the air box. The adapter may extend into the air box. The adapter may extend around a portion of the air box. The adapter may connect to the air box via an original airline. The airline may be disconnected from an original location and then connected to the adapter so that air delivered from to the air box is from the snorkel system. The adapter may connect a snorkel system that is a high mount or a low mount snorkel system.

The high mount snorkel system may include one or more snorkel extenders. The one or more snorkel extenders may connect to the vehicle adapter and extend above the vehicle adapter. The snorkel extender may extend above a hood, a windshield, a roof, or a combination thereof. The snorkel extender may extend along and connect to an A pillar of a vehicle. The snorkel extender includes a snorkel inlet and a snorkel outlet.

The snorkel inlet functions to receive air and provide "dry" air to the air box. The snorkel inlet is located above mud, water, or both so that clean air is provided to the engine. The snorkel inlet may be located opposite a snorkel outlet. The snorkel inlet may receive one or more rams. The snorkel inlet may receive air from a ram so that air is supplied into the vehicle adapter and then the air box.

The ram may function to screen some debris from the air that extends into the snorkel system. The ram may include a ram inlet that air is sucked into, pushed into, or both. The ram may face in a direction of movement of a vehicle. The ram inlet may face in a direction of vehicle movement. The ram inlet may be covered by one or more ram grills that may include any of the features discussed herein from the grill. The air may enter the ram through the ram inlet, through the snorkel inlet and then out the snorkel outlet where the air in introduced into the angle adapter.

The snorkel outlet may be coupled to the vehicle adapter, the connection region, extend over the inlet, or a combination thereof. The snorkel outlet may function to provide dry air into the engine compartment via the vehicle adapter. The snorkel outlet may be the only air inlet into the vehicle adapter. The snorkel outlet may block the grill, replace the grill plate, or both. The snorkel outlet may include one or more snorkel apertures.

The snorkel extender may include the same number of apertures as there are posts. The snorkel apertures may be large enough that the posts extend through the snorkel apertures. The snorkel apertures may sit on top of the posts and an aperture may extend through the snorkel apertures.

Figure 1:
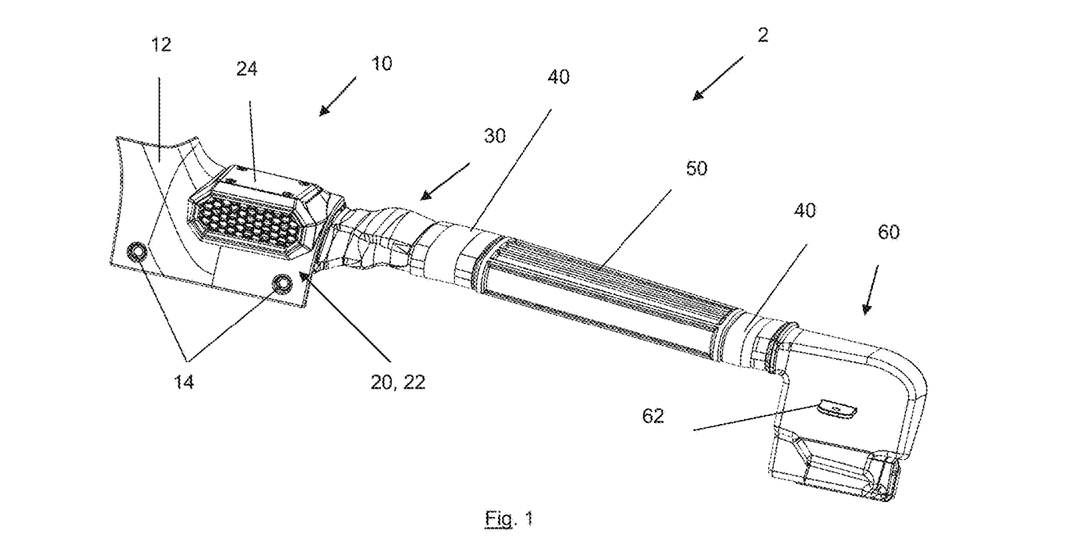
FIG. 1 is a front perspective view of a low mount snorkel system.

FIG. 1 is a front perspective view of a snorkel system 2. The snorkel system 2, includes a vehicle adapter 10, an angle adapter 30, a transfer connector 60, and an air tube 50 extending between and connecting the angle adapter 30 and the transfer connector 60 by connectors 40. The vehicle adapter 10 includes a connection plate 12 with connection apertures 14, an inlet 20 that is covered by a grill 22, and a grill plate 24 covering a top of the inlet 20. The transfer connector 60 includes a transfer adapter 62 that connects to a vehicle (not shown).

Figure 2:
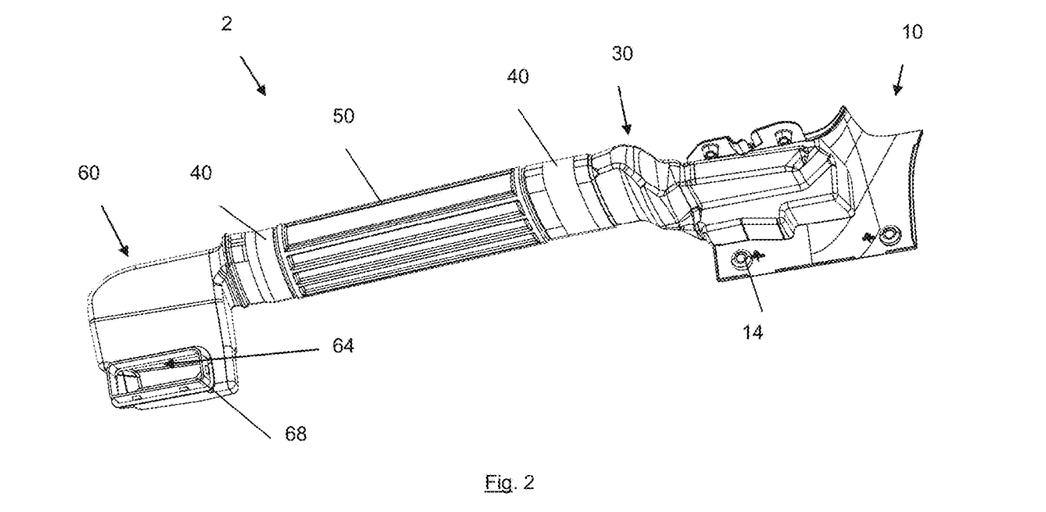
FIG. 2 is a rear perspective view of a low mount snorkel system.

FIG. 2 is a rear perspective view of the snorkel system 2. The snorkel system 2 includes a vehicle adapter 10 including connection apertures 14; an angle adapter 30 connected to a first end of an air tube 50 via connectors 40; a transfer connector 60 connected to a second end of an air tube 50 by connectors 40. The transfer connector 60 includes a transfer outlet 64 and an adapter 68.

Figure 3:
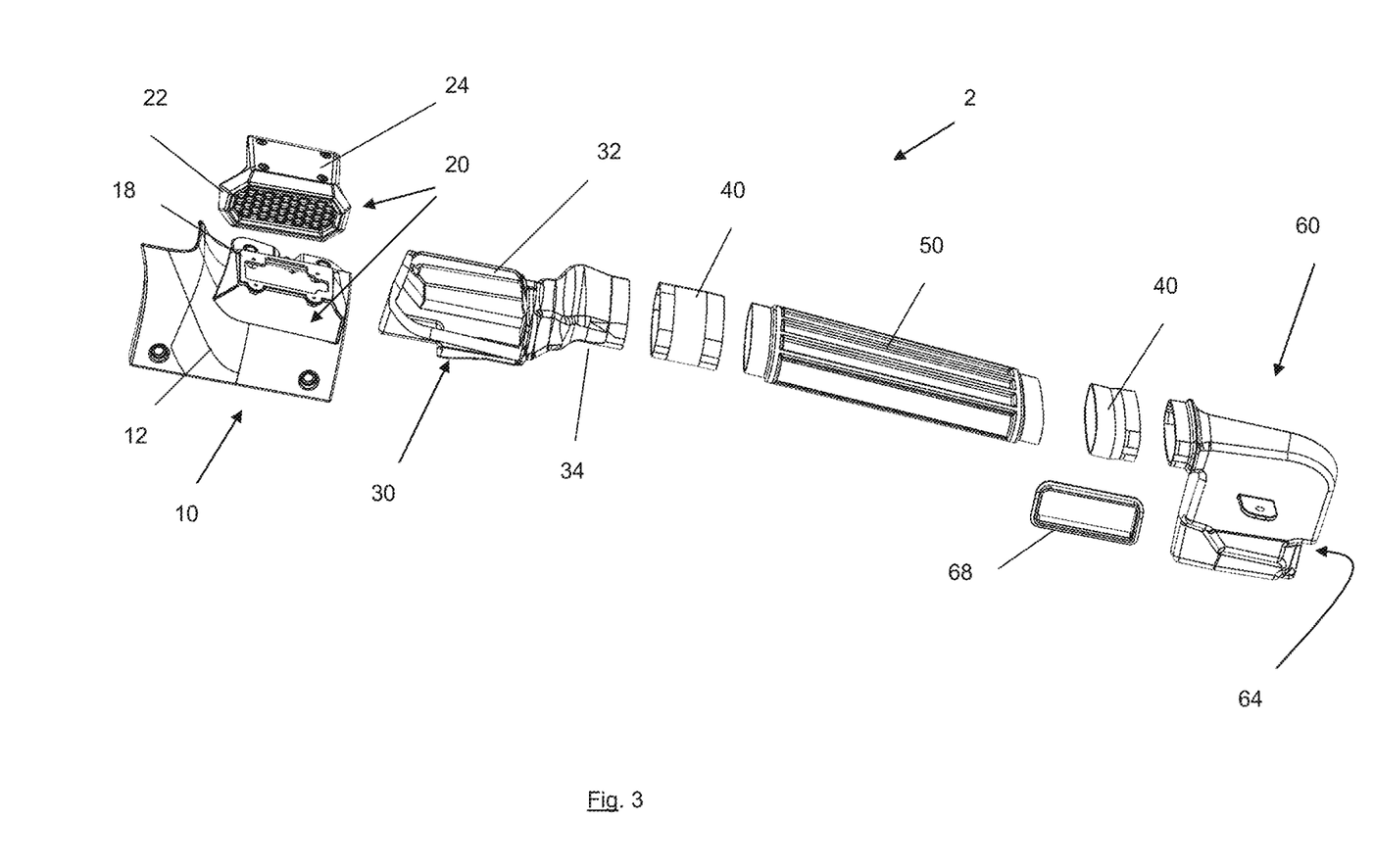
FIG. 3 is an exploded view of a low mount snorkel system.

FIG. 3 is an exploded view of the snorkel system 2. The vehicle adapter 10 includes a connection plate 12 with a connection region 18 that connects the grill plate 24 of the grill 20 into the inlet 20. The angle adapter 30 includes an inlet opening 32 that connects to and extends behind the connection plate 12 so that air enters the inlet 20 and goes into the inlet opening 32. The air is then channeled from the inlet opening 32 to the outlet opening 34 where the air passes into an air tube 50 via a connector 40. From the air tube 50 air moves to the transfer connector 60 via a connector 40 that connects the air tube 50 to the transfer connector 60. The transfer connector 60 includes an adapter 68 that extends over the transfer outlet 64 and connects the transfer connector 60 to an air box of a vehicle (not shown).

Figure 4A:
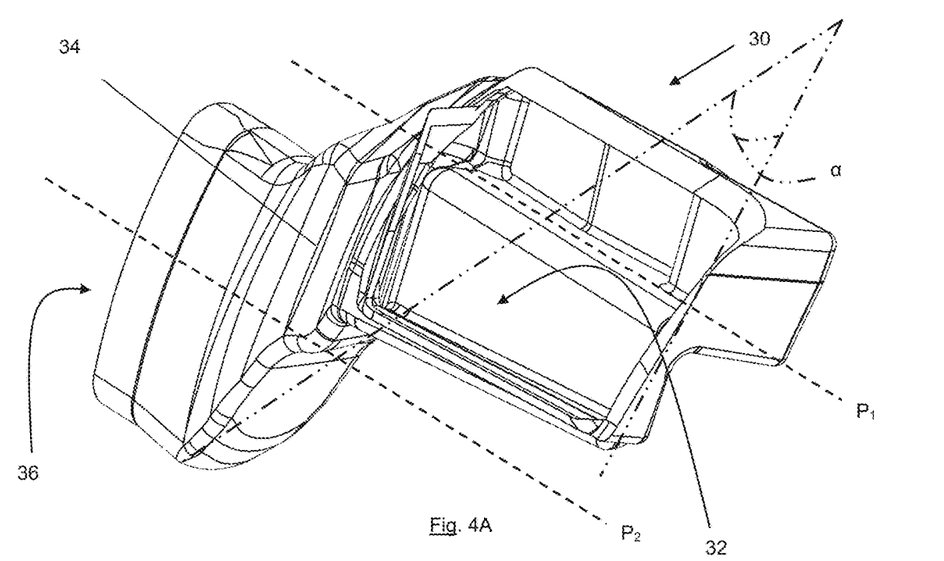
FIG. 4A is a front perspective view of an angled adapter.

FIG. 4A is a front perspective view of an angle adapter 30. The angle adapter includes an inlet opening 32 and an outlet opening 36 with a step tube 34 therebetween. The inlet opening 32 has a central region that extends within a first plane ($P_1$) and the outlet opening 36 has a central region that extends within a second plane ($P_2$) with the first plane and the second plane being spaced apart by the step tube 34 staggering the first plane ($P_1$) and the second plane ($P_2$). As shown, the first plane ($P_1$) and the second plane ($P_2$) are parallel to one another. The step tube 34 extends at ang angle ($\alpha$) relative to the inlet opening 32

Figure 4B:
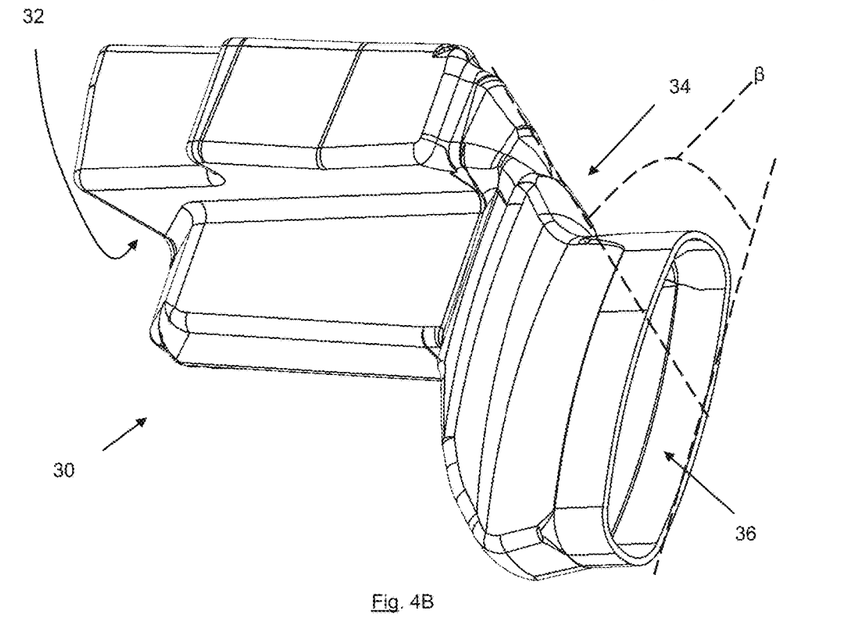
FIG. 4B is a rear perspective view of an angled adapter.

FIG. 4B is a rear view of the angle adapter 30 with the step tube 34 connecting the inlet opening 32 and the outlet opening 36. The step tube 34 extends at an angle ($\beta$) relative to the outlet opening 36.

Figure 4C:
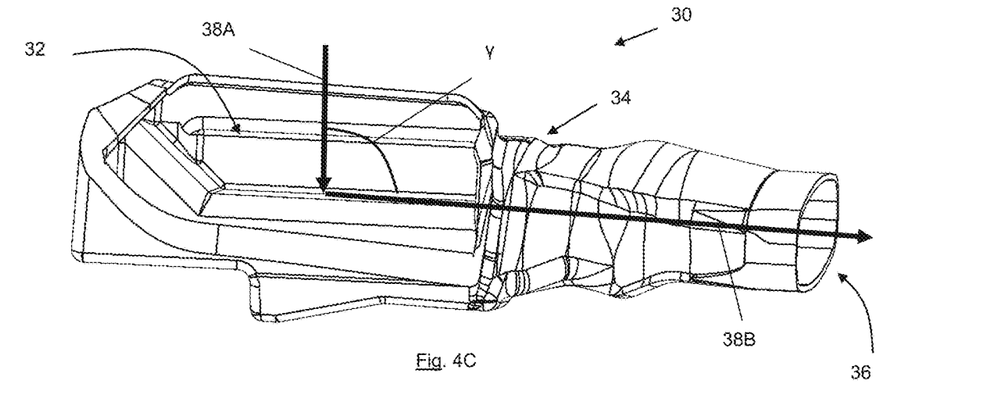
FIG. 4C is a side view of an angled adapter.

FIG. 4C is a side view of an angled adapter 30. The angled adapter 30 includes an inlet 32 and an outlet 36 with a step tube 34 therebetween. Air moves into the angled adapter 20 in a first direction 38A and then changes direction and moves in a second direction 38B. The first direction 38A and the second direction 38B are separated by an angle ($\gamma$).

Figure 5A:
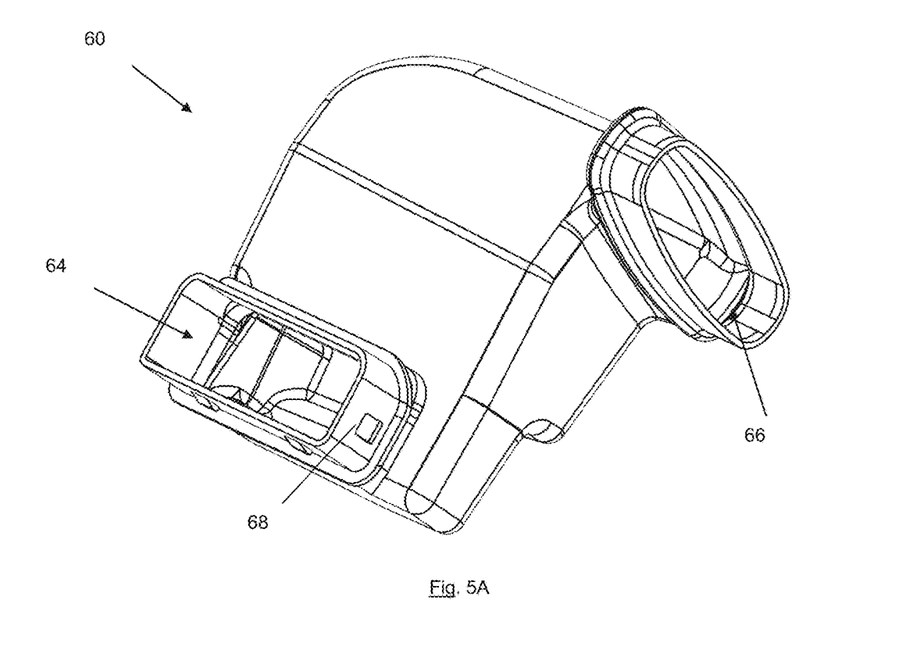
FIG. 5A is a front perspective view of a transfer connector.

FIG. 5A is a perspective view of a transfer connector 60. The transfer connector 60 includes a transfer inlet 66 and a transfer outlet 64. The transfer outlet 64 includes an adapter 68 that connects the transfer connector 60 to an air box of a vehicle (not shown).

Figure 5B:
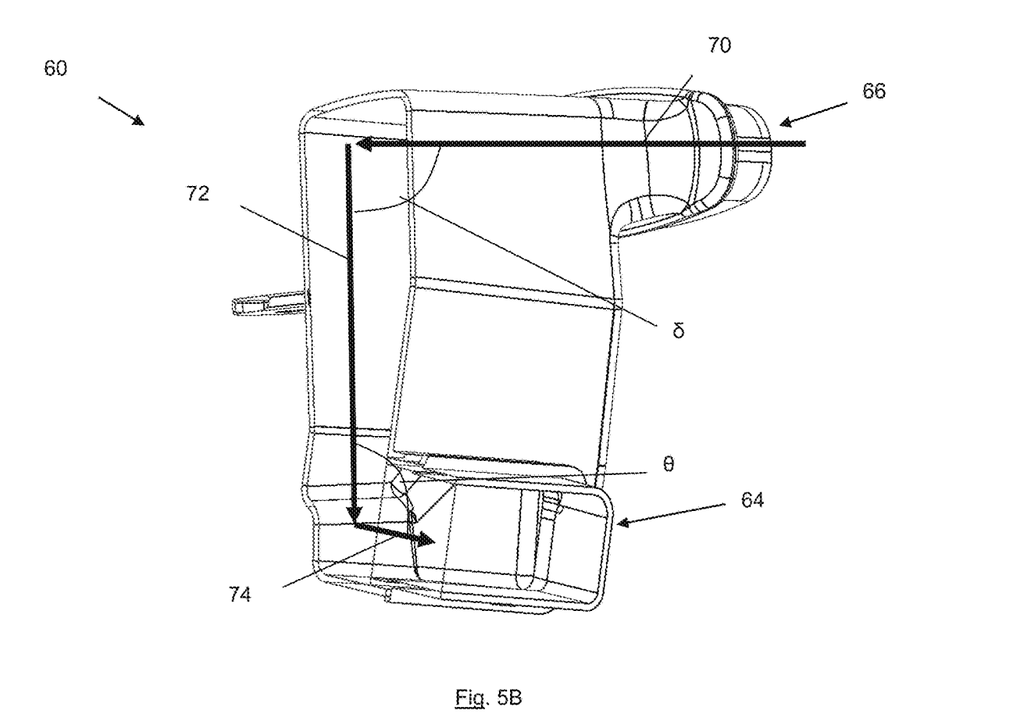
FIG. 5B is a cross-sectional view of the transfer connector.

FIG. 5B is a cross-sectional view of a transfer connector 60. The transfer connector 60 includes a transfer inlet 66 and transfer outlet 64. Air flows into the transfer inlet in a first direction 70. The air flow then turns and flows in a second direction 72 where the first direction 70 and the second direction 72 are an angle ($\delta$) from each other. The airflow then turns an angle ($\theta$) from the second direction 72 to a third direction 74 and extends out of the transfer outlet 64.

Figure 6:
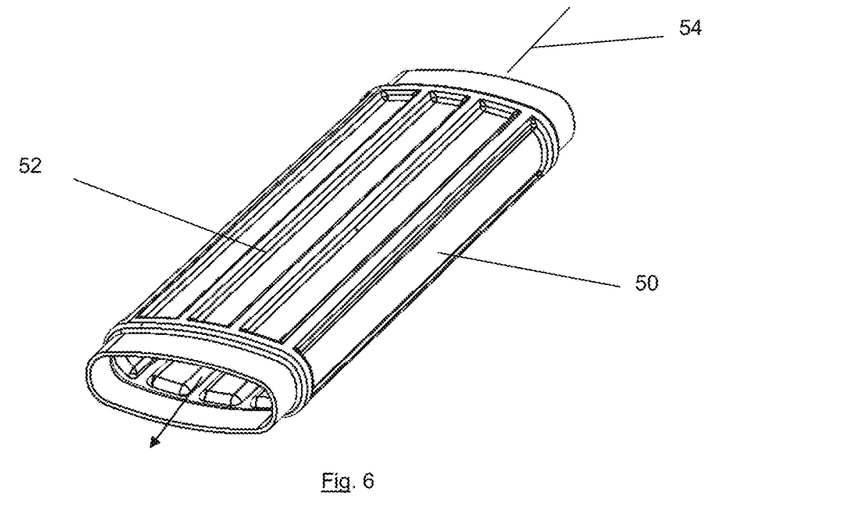
FIG. 6 is a perspective view of an air tube.

FIG. 6 is a perspective view of an air tube 50 including a plurality of ribs 52. Airflow through the air tube 50 is in the direction 54 along a longitudinal axis of the air tube 50.

Figure 7:
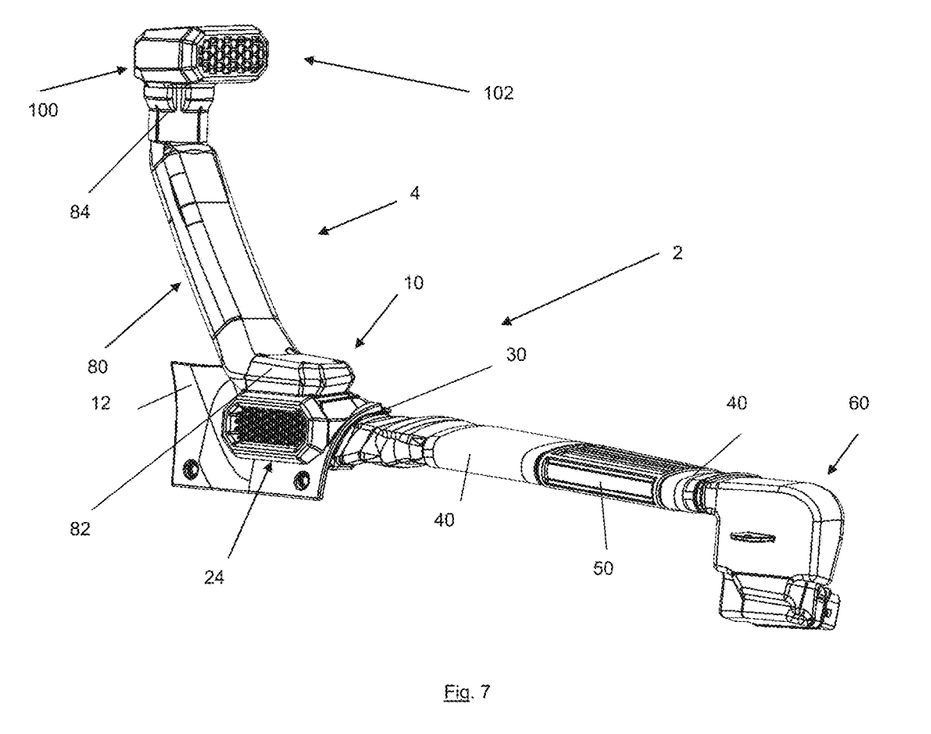
FIG. 7 is a perspective view of a high mount snorkel system.

FIG. 7 is a perspective view of a snorkel system 2 having a high mount 4. The high mount 4 of the snorkel system 2 includes a ram 100 having a ram inlet 102. The ram 100 is connected to a snorkel extender 80 at a snorkel inlet 84. The snorkel extender 80 includes a snorkel outlet 82 that connects to the vehicle adapter 10. The vehicle adapter 10 is connected to a vehicle (not shown) by a connection plate 12. A grill plate 24 connects the snorkel extender 80 to the vehicle adapter 10, and the grill plate 24 closes a lateral inlet of the vehicle adapter. An angle adapter 30 is connected to and extends from the vehicle adapter 10. A transfer connector 60 is connected to the angle adapter 30 by two connectors 40 and an air tube 50.

Figure 8:
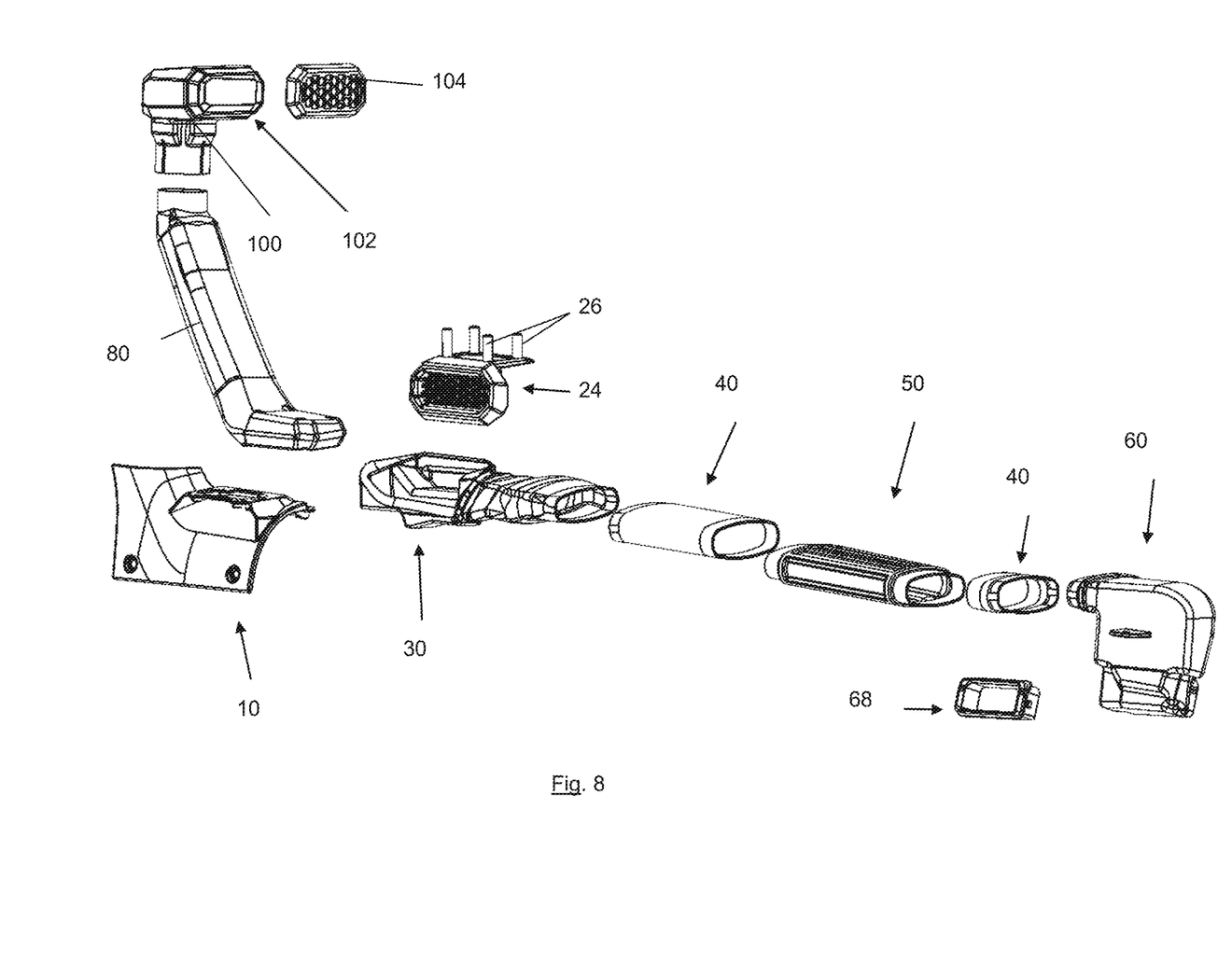
FIG. 8 is an exploded view of a high mount snorkel system.

FIG. 8 is an exploded view showing the snorkel extender 80 disconnected from the grill plate 24. A ram 100 having a ram inlet 102 is shown with the ram grill 104 disconnected. The grill plate 24 includes posts 26 that connect to the snorkel extender 80 and the grill plate connects the snorkel extender 80 to the vehicle adapter 10. The angle adapter 30 is connected to the vehicle adapter 10 on one end and a connector 40 on a second end. A connector 40 is located on each end of the air tube 50 and the connectors 40 connect the air tube 50 to the transfer connector, which includes an adapter 68.

Figure 9A:
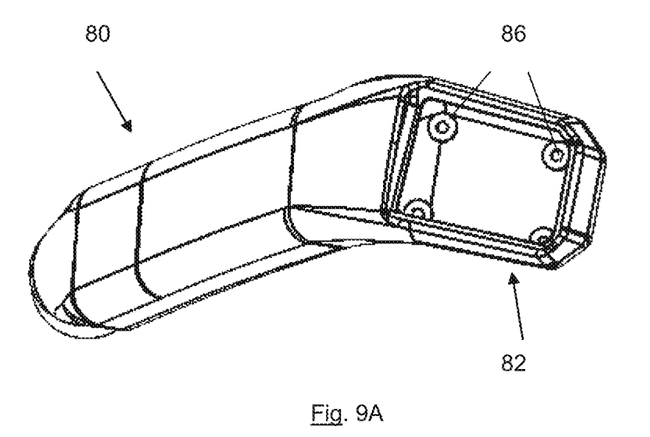
FIG. 9A is a bottom perspective view of a snorkel extender.

FIG. 9A is a bottom perspective view of a snorkel extender 80 where the snorkel apertures 86 located within the snorkel outlet 82 are visible.

Figure 9B:
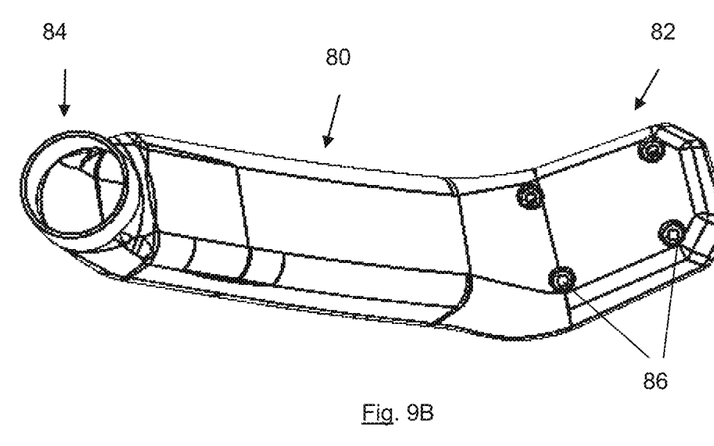
FIG. 9B is a top perspective view of a snorkel extender.

FIG. 9B is a top perspective view of the snorkel extender 80. The snorkel extender 80 includes a snorkel inlet 84 and a snorkel outlet 82. The snorkel outlet 82 includes snorkel apertures 86 that extend through to receive the posts (not shown).

Figure 10:
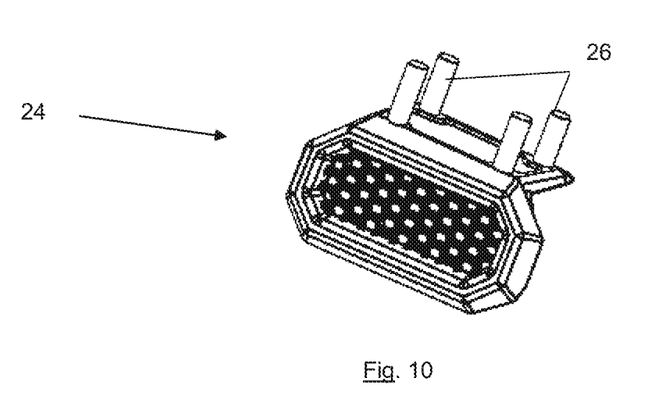
FIG. 10 is a perspective view of a grill plate.

FIG. 10 is a perspective view of a grill plate 24 including a plurality of posts 26.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. Unless otherwise stated, a teaching with the term "about" or "approximately" in combination with a numerical amount encompasses a teaching of the recited amount, as well as approximations of that recited amount. By way of example, a teaching of "about 100" encompasses a teaching of within a range of 100+1-15.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

2 Snorkel System
4 High mount
10 Vehicle adapter
12 Connection plate
14 Connection apertures
18 Connection region
20 Inlet
22 Grill
24 Grill plate
26 Posts
30 Angle adapter
32 Inlet opening
34 Step tube
36 Outlet opening
38A Air flow
38B Air flow
40 connector
50 Air tube
52 ribs
54 Direction of air flow
60 Transfer connector
62 Transfer adapter
64 Transfer outlet
66 Transfer inlet
68 adapter
70 First direction
72 Second direction
74 Third direction
80 Snorkel extender
82 Snorkel outlet
84 Snorkel inlet
86 Snorkel apertures
100 Ram
102 Ram inlet
104 Ram grill

We claim:

1. A snorkel system comprising:
  a. a vehicle adapter configured to connect to a vehicle;
  b. one or more air tubes configured to extend along an interior of an engine compartment of the vehicle; and
  c. one or more angle adapters adapted to be located within the engine compartment of the vehicle, the one or more angle adapters fluidly connecting the vehicle adapter and the one or more air tubes together;
  wherein the one or more angle adapters include:
    an inlet opening located within a first plane, the inlet opening being located proximate to and in fluid communication with the vehicle adapter, and
    an outlet opening being in communication with a first end of the one or more air tubes, the outlet opening being located within a second plane that is spaced apart from and extends substantially parallel to the first plane; and
    wherein air flows into the inlet opening in a first direction and then turns and flows in a second direction towards the outlet opening.

2. The snorkel system of claim 1, wherein the one or more angle adapters include a step tube that extends at an angle relative to the inlet opening and the outlet opening.

3. The snorkel system of claim 2, wherein the angle the step tube extends at relative to the inlet opening is between about 75 degrees and about 15 degrees.

4. The snorkel system of claim 2, wherein the angle the step tube extends at relative to the outlet opening is between about 75 degrees and about 15 degrees.

5. The snorkel system of claim 1, wherein a wall forming a leading edge of the inlet opening and a wall forming a leading edge of the outlet opening are substantially parallel.

6. The snorkel system of claim 1, wherein a step tube extends between and connects the inlet opening to the outlet opening and the step tube extends from the first plane to the second plane.

7. The snorkel system of claim 1, wherein the inlet opening faces a grill of the vehicle adapter.

8. The snorkel system of claim 1, wherein the inlet opening faces away from the engine compartment of the vehicle when the angle adapter is installed within the engine compartment.

9. The snorkel system of claim 1, wherein the one or more air tubes extends along a longitudinal direction of a vehicle.

10. The snorkel system of claim 1, wherein the vehicle adapter includes a grill and a grill plate.

11. The snorkel system of claim 10, wherein the grill plate is solid.

12. The snorkel of claim 1, wherein the angle adapter and the one or more air tubes are connected by one or more connectors.

13. A snorkel system comprising:
  a. a vehicle adapter configured to connect to a vehicle;
  b. one or more air tubes configured to extend along an interior of an engine compartment of the vehicle; and
  c. one or more angle adapters adapted to be located within the engine compartment of the vehicle, the one or more angle adapters fluidly connecting the vehicle adapter and the one or more air tubes together;
  wherein the one or more angle adapters include:
    an inlet opening located within a first plane, the inlet opening being located proximate to and in fluid communication with the vehicle adapter, and
    an outlet opening being in communication with a first end of the one or more air tubes, the outlet opening being located within a second plane that is spaced apart from and extends substantially parallel to the first plane;
    wherein the snorkel system includes one or more transfer connectors that are connected to and in fluid communication with a second end of the one or more air tubes.

14. The snorkel system of claim 13, wherein the one or more transfer connectors are configured to connect to an air box of the vehicle.

15. The snorkel system of claim 13, wherein the one or more transfer connectors include a connector that connects the one or more transfer connectors to the vehicle.

16. The snorkel system of claim 13, wherein the one or more transfer connectors include a transfer outlet and a transfer inlet.

17. The snorkel system of claim 16, wherein air flows into the transfer inlet in a first direction and out of the transfer outlet in a direction that is different than the first direction.

18. The snorkel system of claim 17, wherein air flows from the first direction to a second direction and then a third direction that is the direction out of the transfer outlet.

19. The snorkel system of claim 18, wherein the third direction is perpendicular to both the first direction and the second direction.

20. The snorkel system of claim 13, wherein the vehicle adapter includes a grill and a grill plate, the one or more angle adapters and the one or more air tubes are connected by one or more connectors, and the one or more angle adapters include a step tube that extends at an angle relative to the inlet opening and the outlet opening;
    wherein the angle of the step tube relative to the inlet opening is between about 75 degrees and about 15 degrees and the angle of the step tube relative to the outlet opening is between about 75 degrees and about 15 degrees; and
    wherein a wall forming a leading edge of the inlet opening and a wall forming a leading edge of the outlet opening are substantially parallel.

\* \* \* \* \*